United States Patent

[11] 3,585,565

[72] Inventors Howard Price
Kings Point;
Bela Szilagyi, Flushing, both of, N.Y.
[21] Appl. No. 753,229
[22] Filed Aug. 16, 1968
[45] Patented June 15, 1971
[73] Assignee International Patents & Development Corporation

[54] ELECTRICAL TAPE AND PLUG CONNECTOR
6 Claims, 4 Drawing Figs.
[52] U.S. Cl................................................ 339/14,
174/117, 339/196
[51] Int. Cl........................................... H01r 3/06
[50] Field of Search........................................ 339/12, 14,
17 F, 62, 63, 195, 196, 22, 23; 174/117, 115, 112, 113

[56] References Cited
UNITED STATES PATENTS
2,398,996  4/1946  Benander.................... 339/196
2,622,121  12/1952  Pedersen..................... 339/196 X
3,459,879  8/1969  Gerpheide.................... 174/117
FOREIGN PATENTS
1,319,821  1/1963  France.......................... 174/117 (.6)
684,915  12/1952  Great Britain................ 339/14 (P)

*Primary Examiner*—Marvin A. Champion
*Assistant Examiner*—Robert A. Hafer
*Attorney*—Sparrow and Sparrow ABSTRACT: An electrical tape and plug connector to facilitate simplified installation of electrical wiring. Substantially flat or film conductors are sandwiched between insulating layers of protective material. The sandwich includes a ground conductor insulated from the two main current carrying conductors. One surface of side of the tape or cable is coated with pressure-sensitive adhesive. A three-prong connector adapts the tape or cable to a utility outlet.

PATENTED JUN 15 1971

3,585,565

INVENTORS.
HOWARD PRICE
BY BELA SZILAGYI

SPARROW AND SPARROW
ATTORNEYS

ELECTRICAL TAPE AND PLUG CONNECTOR

BACKGROUND OF THE INVENTION

In the installation of wiring for electrical systems, it is often desirable to install flat-shaped cable or wire tape. Such tape design permits the wiring to lie flatly against a wall surface, for example, and thus does not consume any substantial space nor alter the appearance of the surface being wired. To provide protection from electrical shock, it is also desirable to include within the tape, a ground conductor. This ground conductor prevents electrical shock as a result of defects which may prevail in the equipment to which the tape is connected, or in defects developed in the use of the tape itself. When using such flat tape, or cable, at the same time, it is required that a suitable plug connector be provided for the purpose of connecting the conductors within the tape to a utility outlet. The present invention provides a novel design of such a plug connector and thereby overcomes the disadvantages that have prevailed heretofore, in the use of electrical conductor tapes.

SUMMARY OF THE INVENTION

An electrical conductor tape or cable is formed by sandwiching two main current carrying conductors and a ground conductor between insulating layers of material. The ground conductor is arranged within the tape to assure that any electrical shock which may possibly arise from defects within the tape, are prevented. The two main conductors within the tape are maintained isolated from each other through a novel design of the structure of the insulating layers. The tape is used in conjunction with the plug connector which adapts the tape to use with a utility outlet. The plug connector includes two sections of a housing between which the tape or cable is maintained and securely connected to the prongs or pins of the connector. Setscrews of insulating material are threaded into the housing and cause the pressure plate to press the bared conductors of the cable firmly and into electrical contact with pins of the plug connector.

Various further and more specific purposes, features and advantages will clearly appear from the detailed description given below taken in connection with the accompanying drawing which forms part of this specification and illustrates merely by way of example, embodiments of the device of the invention.

BRIEF DESCRIPTION OF THE DRAWING

In the following description and in the claims parts will be identified by specific names for convenience, but such names are intended to be as generic in their application to similar parts as the art will permit. Like reference characters denote like parts in the several figures of the drawing, in which

DESCRIPTION OF THE PREFERRED EMBODIMENTS

Figure 1:
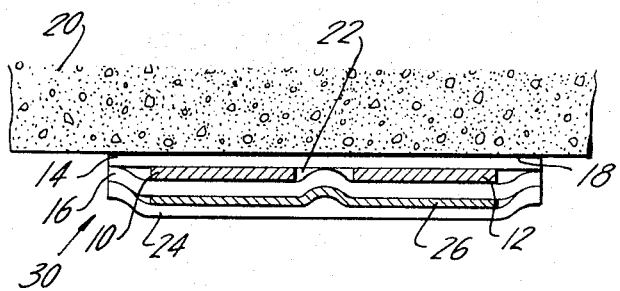
FIG. 1 is a cross-sectional view of the electrical tape or cable, and shows the construction in which the conductors of the tape or cable are maintained electrically isolated from each other.
Figure 2:
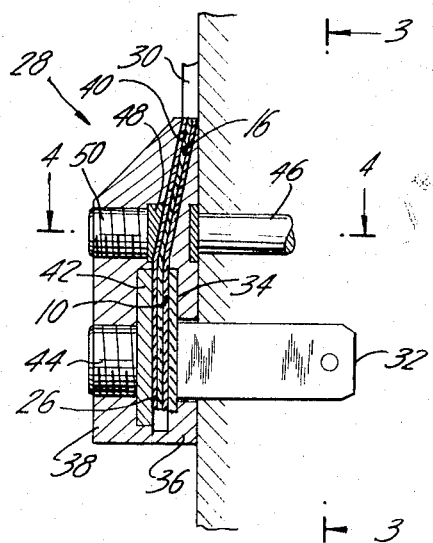
FIG. 2 is a sectional side view of the plug connector for adapting the tape or cable of FIG. 1 to a utility outlet, in accordance with the present invention.
Figure 3:
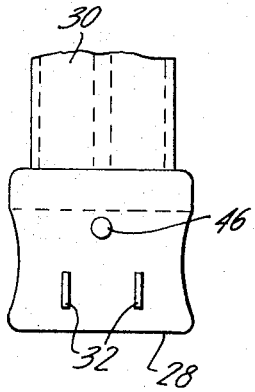
FIG. 3 is an end view taken along line 3-3 in FIG. 2 and shows the layout of the connector pins.

Referring to the drawing and in particular to FIG. 1, the electrical tape or conduit in accordance with the present invention, has two current carrying conductors 10 and 12 sandwiched between two layers of insulating materials 14 and 16. The insulating layer 14 is provided with a pressure-sensitive coating 18. This pressure-sensitive coating in the form of an adhesive is applied to the surface of the layer 14 which lies opposite to the surface in contact with the conductors 10 and 12. The pressure-sensitive adhesive is provided on the external surface of the lay 14 for the purpose of permitting the tape or cable to be simply attached to a wall 20, for example, shown in the drawing. The adhesive layer 18 permits the installation of the tape or cable with ease and without the use of any tools. Thus, no staples, cable clamps or other clips used conventionally in the installation of conduits are required with the use of the tape in accordance with the present invention.

The two conductors 10 and 12 are maintained physically separated from each other through the space 22. By maintaining the two conductors separated in this manner, they are prevented from becoming shortened through contact with each other. The layer 16, may further assure that separation between the two conductors 10 and 12 is maintained, by partially filling the space 22 as shown in FIG. 1. Thus, as a result of the bend in the insulating layer 16, so that it extends into the space 22, the conductors 10 and 12 are prevented from sliding into contact with each other. The necessity for maintaining the two conductors 10 and 12 separated from each other is well known in the art, in order to obtain a proper operating electrical circuit.

A ground conductor 26 is sandwiched between the insulating layer 16 and 24. In use, the ground conductor is always maintained at ground potential, regardless of the potential that may be applied to either the conductor 10 or 12. The ground conductor may be shaped to conform to the contour of the insulating layer 16. Thus, the ground conductor 26 may follow the bend of insulating layer 16 which extends into the space 22. The inclusion of the ground conductor 26 serves as a protective means, as well known in the art, by preventing electrical shocks which may result from faulty equipment to which the tape or cable may be connected. Heretofore, however, such ground conductors within a cable did not prevent electrical shocks from occurring as a result of defects in the cable itself. Thus, in the usual cable available, in the past, it is possible to receive a shock when coming into contact with an area of the cable at which the insulation has worn off and one of the conductors is exposed. Under such conditions, electrical shock can only be prevented if such exposed conductor were also connected to the ground conductor. This situation will, in general, not occur in the cables designed as conventionally known. By bridging both conductors 10 and 12, in the manner shown in FIG. 1, the ground conductor 26 serves as a fullproof safety device. Thus, by being spread over an area extending the full width of the cable, it is unlikely that any defect in the insulation which may arise within the cable, will not cause the conductors 10 and 12 to short against the ground lead or conductor 26. Once such shorting action takes place between either one of the conductors 10 or 12 and the ground lead 26, any person in contact with the cable will be protected from electrical shock. It is to be noted that in a properly wired electrical system, adequate fuses will be included in the wiring, and these fuses will open the electrical circuit when such shorting action within the cable takes place due to defects developed therein.

The insulating layers 14, 16 and 24 may be constructed of Teflon, nylon, rubber, paper, or any suitable material having insulating or dielectric properties. It is generally desirable that the conductors 10, 12 and 26 be of copper or other good electrical conducting material, in order to maintain any electrical losses through the cable at a low value. The adhesive layer 18 may have a base of paper, or any substance having good insulating properties. The thickness of any one of the conductors may be of the order of 0.003 inches, whereas the thickness of an insulating layer may be within the range of 0.002 to 0.005 inches. The total thickness of the tape may be within the range of 0.014 to 0.019 inches.

At both edges of the cable, directed longitudinally along the cable axis, the insulating layers 14, 16 and 24 are pressed together and joined through suitable adhesive or sealing substance. At the same time, these longitudinal sides of the cable may be sealed, in any conventional manner, such as through heat and pressure when the insulating layers are made of, for example, plastics.

A plug connector 28 is provided for use with the cable 30, so that the latter may be connected to a conventional utility outlet. The plug connector 28 is provided with two prongs or connector pins 32 each secured to a base 34. The connector pins 32 and bases 34 are of electrically conducting material. The prongs or pins 32 together with their bases 34 are seated within the portion 36 of the housing of the plug connector 28. The design of the housing of the connector can be such that the two sections of the housing are integrally constructed or connected in two sections, such as 36 and 38 each being separate, attached together by conventional means such as a strap (not shown in the drawing). A slot 40 is situated in the housing in order to accommodate the tape or cable 30. The bared conductor 10 is brought into contact directly with the conductive base 34 within the housing. In a similar manner, the conductor 12 is brought into electrical contact with the other conductive base 34. The insulating layers and adhesive layer surrounding the conductors are removed in the usual manner, preparatory to inserting the end of the cable into the plug connector.

To maintain the conductor 10 or 12 firmly in contact with base 34 of prong or pin 32, a pressure plate or contact plate 42 is provided. This pressure plate 42 is forced against the conductor 10 or 12 as a result of the action of a screw 44. The section 38 of the housing is internally threaded to accommodate the screw 44. Thus, when turning the screw into the section 38, the screw is made to bear against the pressure plate 42 and this in turn, forces the conductor 10 or 12 in complete electrical contact with the prong or pin 32 through the base 34. Furthermore, by properly seating the screw 44 which may be in the form of a Setscrew, the cable 30 is prevented from slipping out of the plug connector. The pressure plate 42 may be made of insulating material so that it may bridge the bases 34 of both pins or prongs 32 without shorting them. With such a design in which the pressure plate 42 is thus made of insulating material, only one setscrew 44 is required to maintain both conductors 10 and 12 firmly against the bases 34, and hence in electrical contact with the pins 32. It is quite feasible to also provide a separate screw 44 for each one of the pins or prongs 32. In that event, the pressure plate 42 may be made of conductive material, providing the two pressure plates are maintained physically separated from each other. With this design, at the same time, it is essential that the setscrew 44 be made of insulating material such as for example, nylon.

Figure 4:
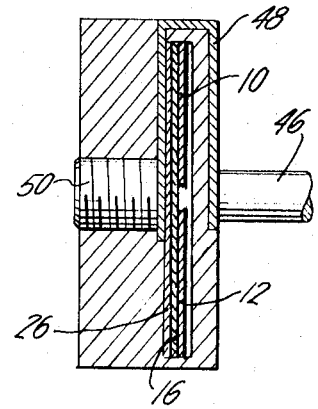
FIG. 4 is a sectional view taken along line 4-4 in FIG. 2 and shows the interconnection of the ground wire in the tape or cable with the ground pin of the plug connector.

When assembling the cable 30 to the plug connector 28, the adhesive surface of the cable faces the ground pin or prong 46 of the plug connector. As a result, the ground conductor 26 is remotely located within the cable, from the pin 46. Thus, in the assembly, the pin 46 is adjacent to the conductor 10 and 12, whereas remotely located from the ground conductor 26. In order to connect the ground pin 46 to the ground conductor 26 in the cable or tape, the arrangement of FIG. 4 is provided. The pin 46 is in electrical contact with a conducting plate 48 which reaches around the edge of the tape and extends to the other side thereof. The conducting plate 48 is firmly clamped to the ground conductor 26, through means of a setscrew 50. The latter is threadably inserted into the section 38 of the housing of the plug connector similarly to that described in relation to the setscrew 44. By driving the setscrew 50 into its proper seating position, the conducting plate 48 is pressed against the bare conductor 26, and thus electrical continuity is established between the ground conductor 26 and the pin 46. The setscrew 50 is made of insulating material such as nylon, similar to that of setscrew 44. Furthermore, the housing of the plug connector is also made of insulating material to prevent interaction of the prongs or pins 32 and the pin 46. Materials such a plastic or rubber are suitable for this purpose.

While the invention has been described and illustrated with respect to a certain preferred example which gives satisfactory results, it will be understood by those skilled in the art after understanding the principle of the invention, that various changes and modifications may be made without departing from the spirit and scope of the invention and it is intended therefore in the appended claims to cover all such changes and modifications.

What we claim is:

1. Electrical tape and connector combination comprising:
   a. two conductors disposed longitudinally parallel to each other and electrically isolated from each other for carrying current in a closed circuit, said two conductors having a rectangular cross section in which the thickness is substantially smaller than the width;
   b. a ground conductor straddling said two conductors and electrically isolated therefrom, said ground conductor being disposed adjacent said two conductors and having a rectangular cross section in which the thickness is substantially smaller than the width, the width of said ground conductor straddling the combined widths of said two conductors;
   c. electrically insulating strip means between said two conductors and said ground conductor to retain said conductors isolated from each other;
   d. adhesive strip means secured to an exterior side of one of said insulating strips for mounting said tape on a desired surface, the combination of said conductors, insulating strip means and adhesive strip means comprising a three conductor tape cable;
   e. connector prongs in contact with the ends of said two conductors;
   f. a ground connector prong in contact with the end of said ground conductor;
   g. a connector housing with a slot for receiving said tape cable and with a cavity communicating with said slot for holding said two prongs, said two prongs projecting partially from said housing through openings thereof, said housing having a recess for holding said ground connector prong; clamping means within said slot and said cavity and in contact with said conductors for clamping said conductors to said prongs so that said conductors are in electrical contact with said prongs; first threaded fastening means threaded in said housing and in contact with said clamping means for forcing said clamping means against said two conductors and said two prongs; a U-shaped conductive member in contact with said ground prong and with said ground conductor; and second threaded fastening means threaded in said housing and in contact with said clamping means for forcing said clamping means against said ground conductor and said ground prong.

2. The electrical tape and connector combination as defined in claim 1 wherein said electrically insulating strips are of "Teflon" material.

3. The electrical tape and connector combination as defined in claim 2 wherein said insulating strips are sealingly joined to each other at their edges along the longitudinal axis of said tape.

4. The electrical tape and connector combination as defined in claim 1 wherein said conductors are disposed between said ground conductor and said adhesive strip.

5. The electrical tape and connector combination as defined in claim 1 wherein said adhesive strip is pressure-sensitive for securing said tape firmly against said surface through application of substantially light pressure.

6. The electrical tape and connector combination as defined in claim 1 wherein said threaded fastening means comprises a fastening screw of insulating material threadably received by said housing.